(12) United States Patent
Yamamoto (10) Patent No.: US 6,523,815 B2
(45) Date of Patent: Feb. 25, 2003

(54) VIBRATION-PROOF DEVICE (75) Inventor: Kentaro Yamamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/074,664

(22) Filed: Feb. 12, 2002

(65) Prior Publication Data

US 2002/0149143 A1 Oct. 17, 2002

(30) Foreign Application Priority Data

Apr. 16, 2001 (JP) ......................................... 2001-117217

(51) Int. Cl.[7] .......................... F16F 13/00; F16F 15/00; F16F 5/00; F16F 9/00; F16M 11/00
(52) U.S. Cl. ................ 267/140.13; 267/292; 267/141.5; 267/219
(58) Field of Search ..................... 267/140.11, 140.12, 267/140.13, 136, 292, 219, 141.3, 141.4, 141.5, 140.14, 140.15, 140.2, 140.3, 140.4, 140.5

(56) References Cited

U.S. PATENT DOCUMENTS

| | | | | |
|---|---|---|---|---|
| 4,842,258 A | * | 6/1989 | Misaka et al. | 267/140.13 |
| 5,433,421 A | * | 7/1995 | Ishiyama | 267/140.13 |
| 6,311,963 B1 | * | 11/2001 | Suzuki et al. | 267/140.13 |
| 6,435,487 B1 | * | 8/2002 | Takaoka et al. | 267/140.13 |
| 2002/0135114 A1 | * | 9/2002 | Takashima et al. | 267/140.13 |
| 2002/0158389 A1 | * | 10/2002 | Yoshida et al. | 267/140.11 |
| 2002/0158391 A1 | * | 10/2002 | Kodama et al. | 267/140.13 |

FOREIGN PATENT DOCUMENTS

| | | |
|---|---|---|
| JP | 9-242810 | 9/1997 |
| JP | 9-329180 | 12/1997 |
| JP | 10-54438 | 2/1998 |

* cited by examiner

Primary Examiner—Christopher P. Schwartz
Assistant Examiner—Devon Kramer
(74) Attorney, Agent, or Firm—Jordan and Hamburg LLP (57) ABSTRACT A liquid-filled vibration-proof device constructed so that the positioning and supporting function of a partition is performed firmly and a port opening of an orifice passage in the partition is not obstructed to ensure a sufficient opening area of the port opening. To that end, a diaphragm and a partition located inwardly thereof are hermetically fixed to a cylindrical fitting at a side opposing a vibration-isolating base thereby partitioning an enclosure between the vibration-isolating base and the diaphragm into two liquid chambers, the both liquid chambers being put in communication with each other through the orifice passage; the vibration-isolating base is provided at a marginal part of its inner face with protruding portions for positioning, with which an upper marginal portion of the partition is in opposed contact, disposed circumferentially at intervals at plural positions so as not to impede the flow of the port opening.

16 Claims, 6 Drawing Sheets

PRIOR ART

FIG. 8

PRIOR ART

VIBRATION-PROOF DEVICE

BACKGROUND OF THE INVENTION

1. Field of the Invention

This invention relates to a liquid-sealed vibration-proof device primarily used for supporting or bearing a vibration generator such as an automotive engine in an antivibratory manner.

2. Description of Related Art

Hitherto, as a liquid-sealed vibration-proof device for supporting an automotive engine or any other vibration generator so as not to transmit its vibrations to the vehicle body, there have been known a variety of ones versatile in structure.

Figure 7:
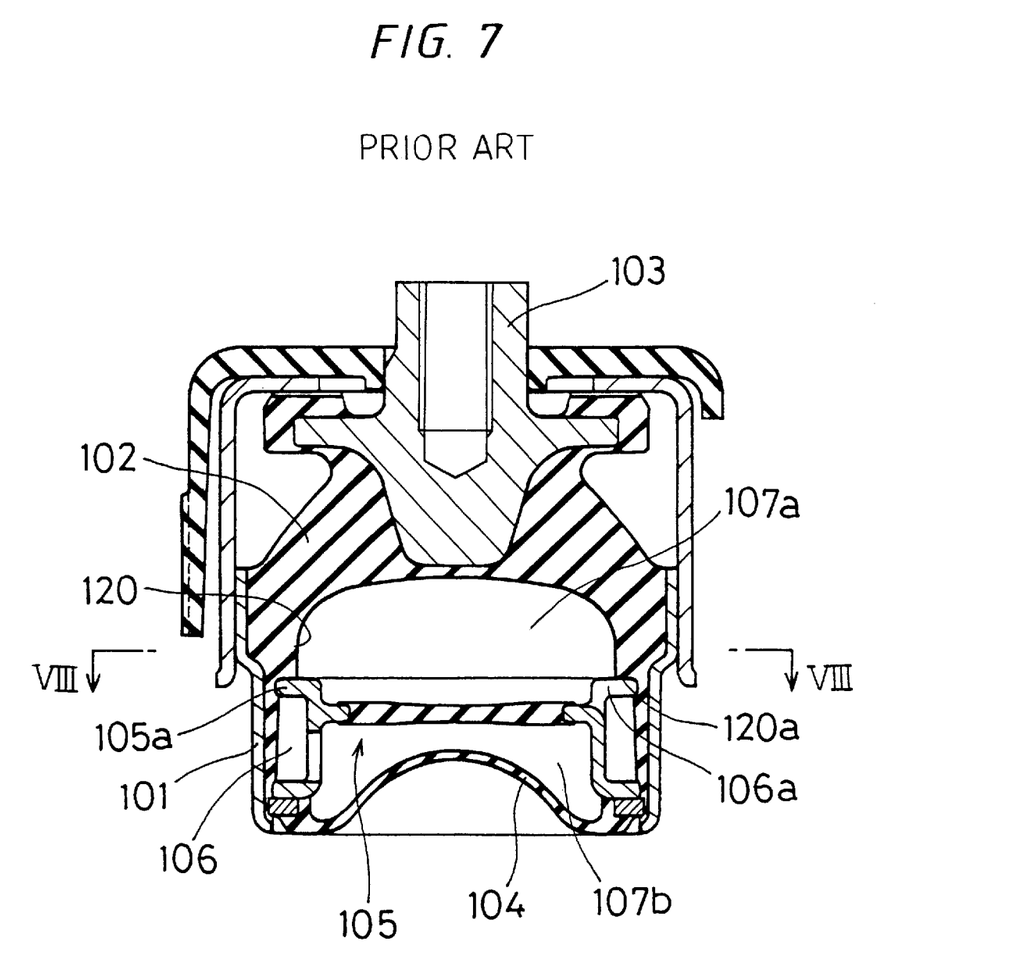
FIG. 7 is a longitudinal sectional view exemplifying a prior art vibration-proof device.
Figure 8:
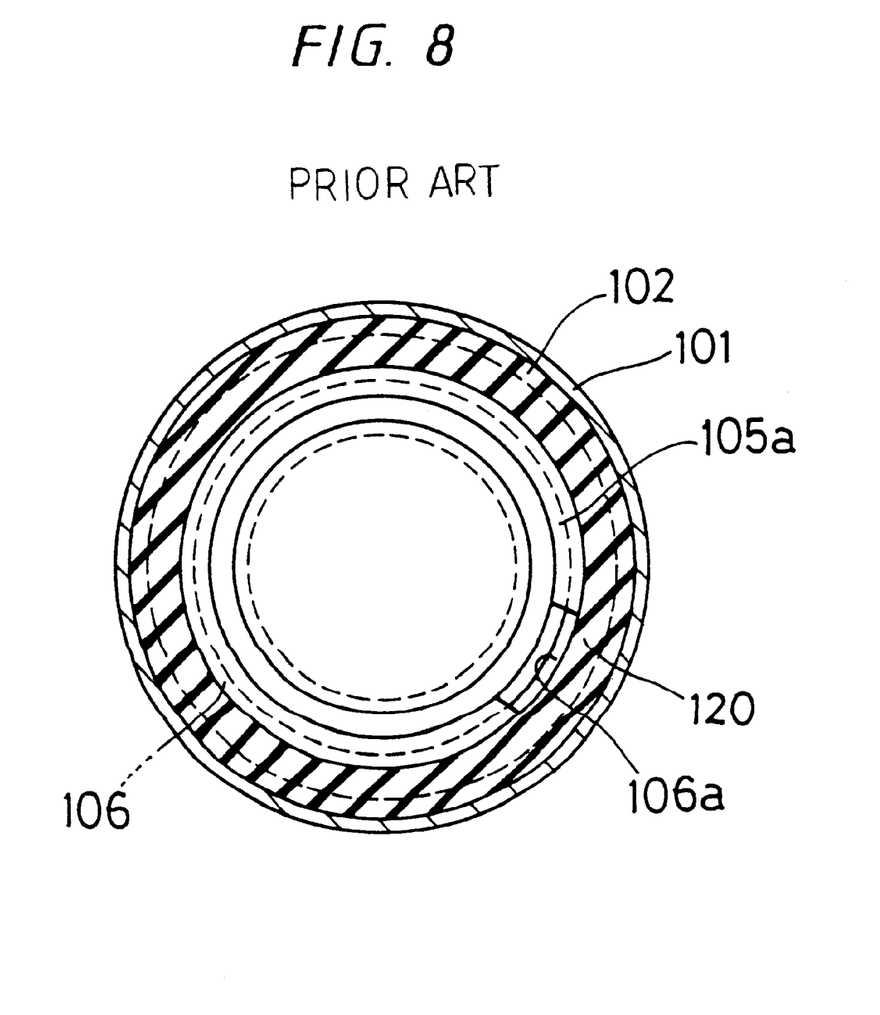
FIG. 8 is a sectional view of FIG. 7 taken along the line VIII—VIII.

For example, FIGS. 7 and 8 illustrate a liquid-sealed vibration-proof device of a two-chamber type constructed so that a cylindrical fitting (101) and an attachment fitting (103) are connected through a vibration-isolating base (102) made of rubber elastomer; a diaphragm (104) made of rubber membrane and a partition (105) located inwardly of the diaphragm (104) are fixed hermetically to an open end side of the cylindrical fitting (101) opposing the vibration-isolating base (102), thus partitioning an interior room between the vibration-isolating base (102) and the diaphragm (104) into two liquid chambers (107a)(107b) on the vibration-isolating base side and the diaphragm side; both liquid chambers (107a)(107b) are put in communication with each other through an orifice passage (106) formed in an outer periphery of the partition (105), whereby a vibration damping function and a vibration insulating function are achieved owing to the fluidization effect via the orifice passage and the antivibratory effect of the vibration-isolating base.

In the previous vibration-proof device, the partition (105) together with a reinforcement fitting (104a) the marginal portion of the diaphragm (104) are fitted from an open side of the cylindrical fitting (101) opposite to the vibration-isolating base (102) by press-fitting or inserting means and fixed by drawing of the cylindrical fitting (101) and crimping at its terminal edge so as not to be detached.

In assembling this vibration-proof device, in order that the aforementioned partition (105) to be press-fitted may be received and held in place within the cylindrical fitting (101), the vibration-isolating base (102) is formed at its inboard marginal part with a protuberant portion (120) having a step face (120a), with which an upper marginal portion (105a) of the partition (105) is in opposed contact, whereby permitting the axial positioning and supporting of the partition (105).

The aforesaid protuberant portion (120) as a positioning means has been heretofore formed so that the inside marginal part of the vibration-isolating base (102) is made thick-walled in its whole circumference so as to form the step face (120a) at the inboard side, as depicted in FIG. 8. Consequently, an effective rubber leg length (effective diameter) of the vibration-isolating base (102) performing a piston action attendant on the vibrations of the attachment fitting (103) becomes smaller by that.

Further, at the upper marginal portion (105a) of the partition (105) being in opposed contact with the step face (120a) there is formed a port opening (106a) of the orifice passage (106) at the outer periphery. However, since the positioning means due to the step face (120a) is formed in the whole circumference as mentioned above, it will shut partly or mostly the upside opening of the port opening (106a) even if the overhang is slight. Because of that, a sufficient flow through the orifice passage (106) cannot be ensured.

In order to ensure the flow through the orifice passage thereby achieving a sufficient vibration-damping characteristic, the port opening (106a) of the orifice passage (106) is required to ensure a predetermined opening area, but yet the step face (120a) shuts the port opening (106a) appreciably owing to the protuberant portion (120) for positioning, so that a sufficient vibration-damping characteristic cannot be exhibited.

To lengthen the circumferential width of the port opening with a view to solving the aforementioned problem will shorten the length of the orifice passage itself even if it is possible to ensure a sufficient opening area. Thus there are still problems of many restrictions in the aspect of characteristics and a poor practicability.

SUMMARY OF THE INVENTION

This invention has been made in view of the prior art problems, and accordingly, is aimed at furnishing a vibration-proof device, whose positioning means for the partition provided at the inner marginal part of the vibration-isolating base is comprised of protruding portions for positioning such that can perform its positioning function firmly, little shuts the port opening of the orifice passage in the partition, can secure sufficiently the opening area of the port opening even if it overlaps with the port opening, and can secure sufficiently the flow through the orifice without the necessity of making its circumferential width excessively large.

The present invention for solving the aforesaid problems is directed, in generic terms, to a liquid-filled vibration-proof device, wherein a cylindrical fitting and an attachment fitting are connected through a vibration-isolating base made of rubber elastomer; a diaphragm made of rubber membrane and a partition located inwardly of the diaphragm are fixed in a sealing manner to the opening side of the cylindrical fitting opposing the vibration-isolating base thereby to partition an interior room between the vibration-isolating base and the diaphragm into two liquid chambers; and both liquid chambers are put in communication with each other through an orifice passage defined in the partition. The liquid-sealed vibration-proof device is characterized in that the vibration-isolating base is provided at its marginal inner face with protruding portions for positioning so as not to obstruct the flow through a port opening of the orifice passage, the protruding portions being located circumferentially at a plurality of positions spaced apart at predetermined intervals.

According to this vibration-proof device, the plural protruding portions for positioning disposed on the inner face of the vibration-isolating base permit the partition to be fitted in the inner periphery of the cylindrical fitting to be positioned in place and besides, because of the fact that the plural positions for the protruding portions are circumferentially spaced apart at intervals, it is possible to keep the port opening open and to ensure sufficiently the flow through the orifice passage by deviating the position of the port opening of the orifice passage from the positions of the protruding portions.

In particular, by providing at least circumferentially the protruding portions for positioning to be spaced apart at intervals of a distance larger than the circumferential width of the port opening, the position of the port opening of the orifice passage in the partition can be located at the intermediate between two adjacent protruding portions for positioning, and accordingly, the port opening is by no means obstructed.

Moreover since the plural protruding portions are spaced apart at intervals as previously mentioned, an effective rubber leg length of the vibration-isolating base, namely an effective diameter thereof performing a piston action attended with vertical vibrations of the attachment fitting becomes larger by that, as a result of which the piston efficiency is elevated and the vibration damping performance can be enhanced.

In the previous vibration-proof device, it is preferred that the protruding portions for positioning be provided circumferentially at four or more positions spaced apart at intervals because the positioning function of the partition is thereby performed securely and the partition can be supported without causing any tilting, etc. For example, also in case where one of the protruding portions for positioning whose circumferential width is smaller than that of the port opening of the orifice passage overlaps with the port opening, the positioning of the partition is possible without causing tilting, etc.

The protruding portions for positioning are set such that they can perform the positioning function of the partition and retain a sufficient opening state of the port opening also where they overlap the port opening of the orifice passage. It is preferred that the circumferential width of the protruding portions be made smaller than the circumferential width of the port opening of the orifice passage. It is further preferred that in addition to this, a total length in circumferential width of all the protruding portions be ⅛ to ¼ the circumferential length of the orifice passage. Thereby the aforesaid positioning function can be performed firmly and even if one of them overlaps with the port opening, a required opening area can be ensured thereby to ensure a sufficient flow through the orifice passage.

Furthermore it is preferred that the protruding portions for positioning be formed so that in the condition that one of them overlaps with the port opening of the orifice passage, the opening area at the port opening excluding the overlapping part, on a plane, of the protruding portion may be larger than the area of the overlapping part. Owing to that, the port opening of the orifice passage is free from shutting in a manner to obstruct the flow while performing firmly the positioning function of the partition however the partition is incorporated in assembling.

The forms of working the invention will be hereinafter described with reference to examples as shown in the accompanying drawings.

DESCRIPTION OF PREFERRED EMBODIMENTS

Figure 1:
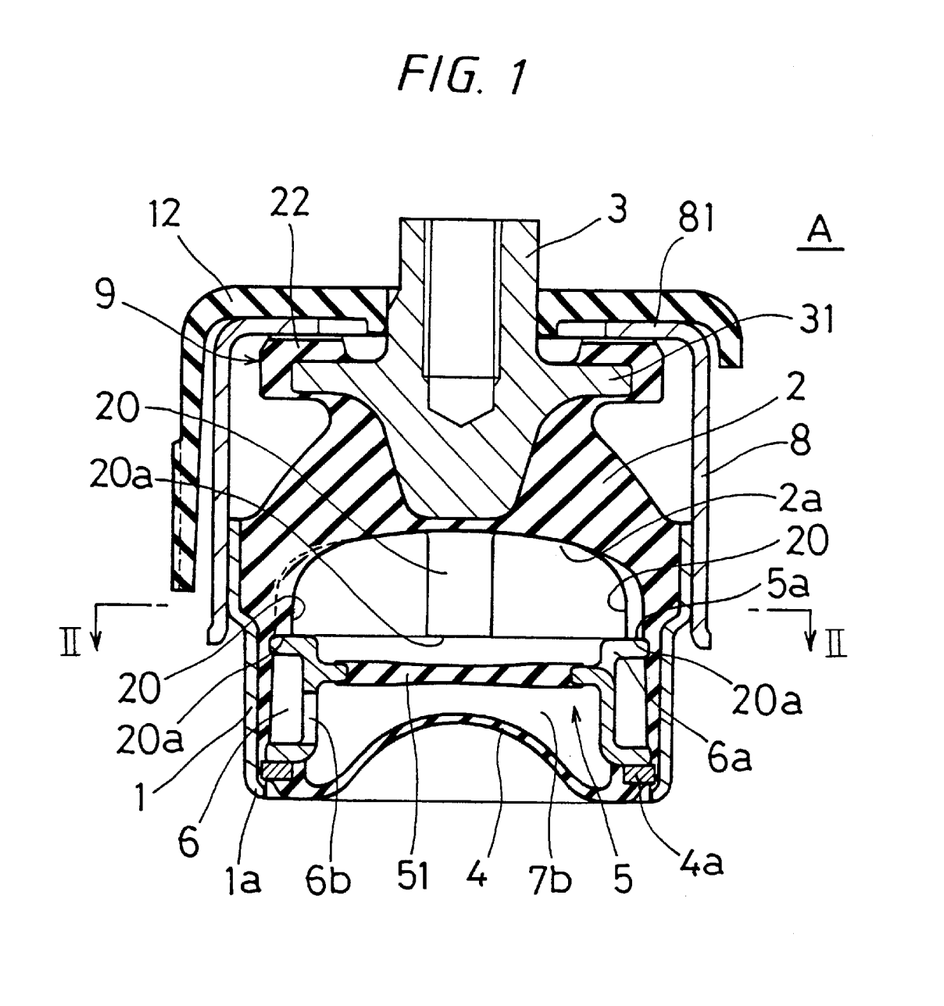
FIG. 1 is a longitudinal sectional view showing one example of a vibration-proof device according to this invention.
Figure 2:
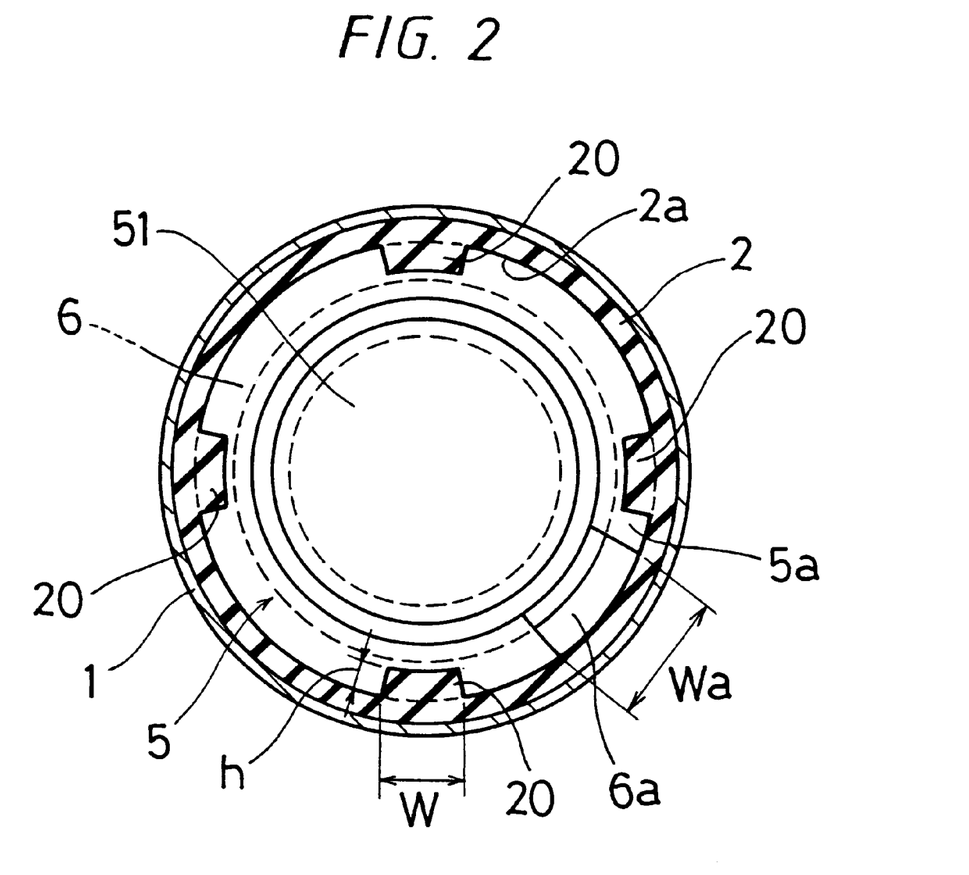
FIG. 2 is a sectional view of FIG. 1 taken along the line II—II.

The vibration-proof device A of the example shown in FIGS. 1, 2 comprises a cylindrical fitting 1, a vibration-isolating base 2 made of rubber elastomer subject to a load of an engine which is bonded hermetically by vulcanization molding means to the cylindrical fitting 1 at its upper opening side and thus fixed integrally, and an upper attachment fitting 3 embedded in the vibration-isolating base 2 by vulcanization molding means to be fixed. That is, the cylindrical fitting 1 and the attachment fitting 3 are interconnected through the vibration-isolating base 2.

At a lower opening side of the cylindrical fitting 1, a diaphragm 4 made of a rubber membrane opposing the vibration-isolating base 2 and a partition 5 located inwardly of the diaphragm are fitted hermetically, which will be later described. An interior room thus defined between the vibration-isolating base 2 and the diaphragm 4 is partitioned by a partition 5 having an orifice passage 6 at its outer periphery into a first liquid chamber 7a on the vibration-isolating base 2 side and a second liquid chamber 7b on the diaphragm 4 side, whereby both liquid chambers 7a, 7b are put in communication with each other through the orifice passage 6. In this manner the liquid-filled vibration-proof device A of a two-chamber type is constituted. The reference numeral 6a is a port opening (ingress-and-egress opening) of the orifice channel 6 on the first liquid chamber 7a side and the reference numeral 6b, a port opening of the orifice channel 6 on the second liquid chamber 7b side.

The attachment fitting 3 on the upper side is formed with a screwed bole 3a for coupling of an attachment bolt. Usually when in use, the attachment fitting 3 is fixed on a bracket of a vibration generator side, e.g. an automotive engine and the cylindrical fitting 1, fixed on a support side, e.g. a vehicle body. In the figures as illustrated, a cylindrical main body fitting 8 concurrently serving as a stabilizer is joined to the outer periphery of the cylindrical fitting 1 by press-fitting means, etc.

Figure 5:
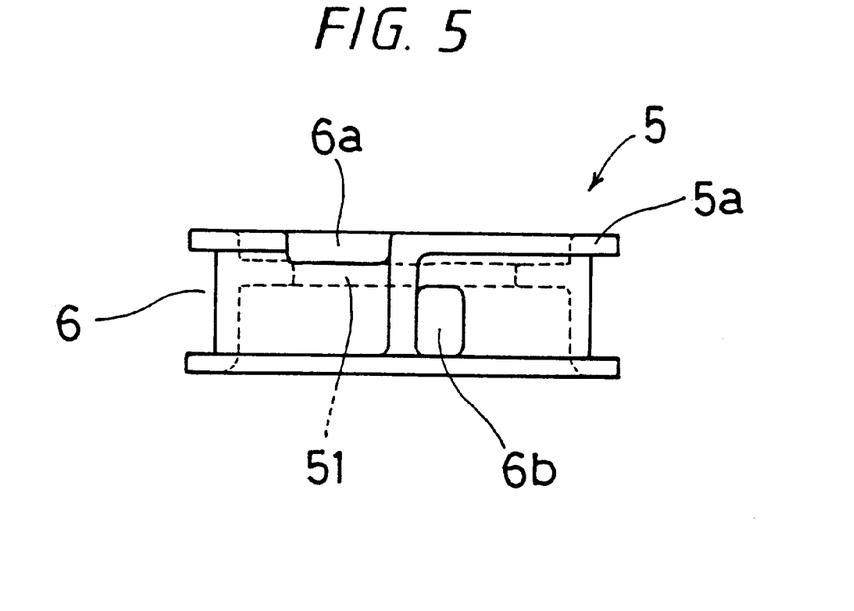
FIG. 5 and FIG. 6 are an elevational view and a plan view, respectively, of a partition.
Figure 6:
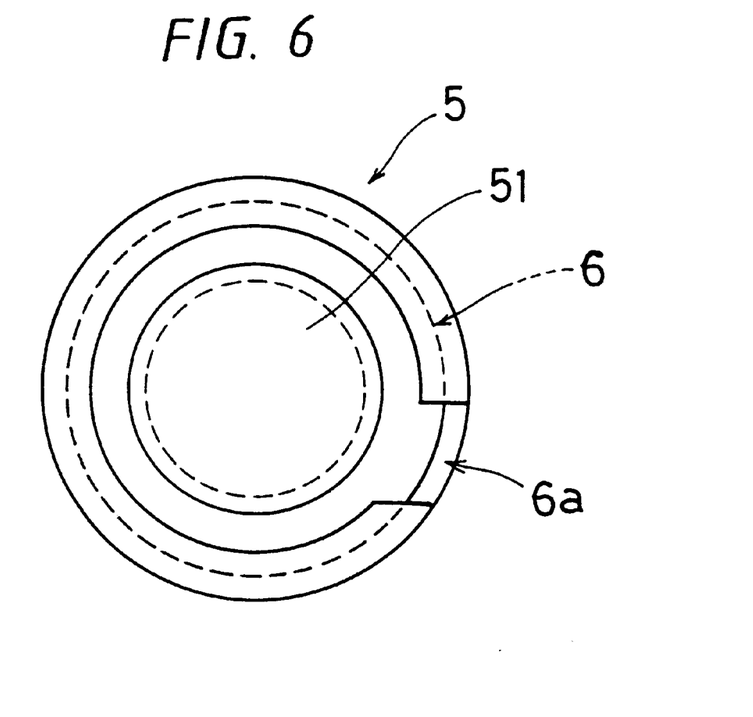

The partition 5 is made of a formed or molded product of a metal material, e.g. aluminum, a synthetic plastic material, a ceramic material, etc. and formed with a depression or groove as the orifice channel 6 at its outer periphery. The partition 5 is partly cut out, at a marginal portion 5a on the upper side thereof, by the port opening 6a communicating with the first liquid chamber 7a and the depression is formed at its bottom side by the port opening 6b communicating with the second liquid chamber 7b. In the illustrated embodiment, a central part of the partition 5 is formed so as to be elastically deformable by a rubber membrane 51. Aside from the aforementioned examples, the partition 5 may be formed by drawing working of a steel plate, etc.

The partition 5 is inserted or press-fitted, together with an auxiliary fitting 4a fixed at a marginal part of the diaphragm 4, from an open lower end side of the cylindrical fitting 1 into the inner periphery thereof and tightened by drawing working of the cylindrical fitting 1, if necessary, followed by further crimping at the terminal edge 1a of the cylindrical fitting 1, whereby being made unable to release or detach.

The vibration-isolating base 2 is further formed, at a marginal part of its inward face 2a, with protruding portions 20 for positioning each having a step face 20a nearly square to the axial center of the device at a plurality of positions so as to be circumferentially spaced apart at intervals of a required distance, preferably a distance larger than a circumferential width (Wa) of the port opening 6a. The upper marginal portion 5a of the partition 5 is in opposed contact with the step faces 20a of the protruding portions 20 without adhesion thereby being positioned in the axial direction, and the port opening 6a of the orifice channel 6 is secured so as to be deviated from the positions of the protruding portions 20.

Figure 4:
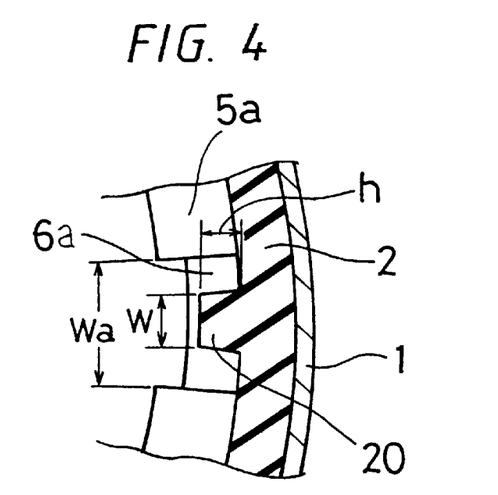
FIG. 4 is an illustrative representation showing a protruding portion for positioning and a port opening of an orifice channel.

In case where the protruding portions 20 for positioning of the vibration-isolating base 2 have a larger circumferential width (W) than the circumferential width (Wa) of the port opening 6a, there is a risk of obstructing the flow at the port opening 6a in the event that the protruding portions 20 and the port opening 6a overlap with each other even if they are located at intervals of a larger distance than the circumferential width (Wa) of the port opening 6a.

Therefore, the protruding portions 20 for positioning are formed to have a circumferential width W smaller than the circumferential width (Wa) of the port opening 6a. However if the circumferential width (W) is too small, a strength required for positioning and supporting the partition 5 cannot be retained even if the projecting radial height (h) is large, and consequently, a total length in circumferential width (W) of all the protruding portions 20 is preferred to be in a range of 1/8 to 1/4 the circumferential length. In practice, the circumferential width (W) is set to be within a range of 1/3 to 2/3 the circumferential width (Wa) of the port opening 6a ultimately so as to be within the previous range to the circumferential length.

If the total length in circumferential width (W) of all the protruding portions 20 is smaller than 1/8 the circumferential length, the positioning and supporting function of the partition 5 will be weak, whereas if it exceeds over 1/4 the circumferential length, the effective radius extension effect of the vibration-isolating base 2 performing a piston action cannot be obtained.

The projecting height (h) of the protruding portions 20 for positioning is set so that they can perform the positioning and supporting function of the partition 5 and more than a half the port opening 6a may not be shut even in the event that they overlap with the port opening 6a. To that end, it is preferred that the projecting height (h) and the circumferential width (W) of the protruding portions 20 be such that under the condition that one of the protruding portions 20 overlaps with the port opening 6a of the orifice channel 6, the opening area of the port opening 6a excluding the overlapping area of the protruding portion 20, on a plane, may be larger than the overlapping area of the protruding portion 20.

Figure 3:
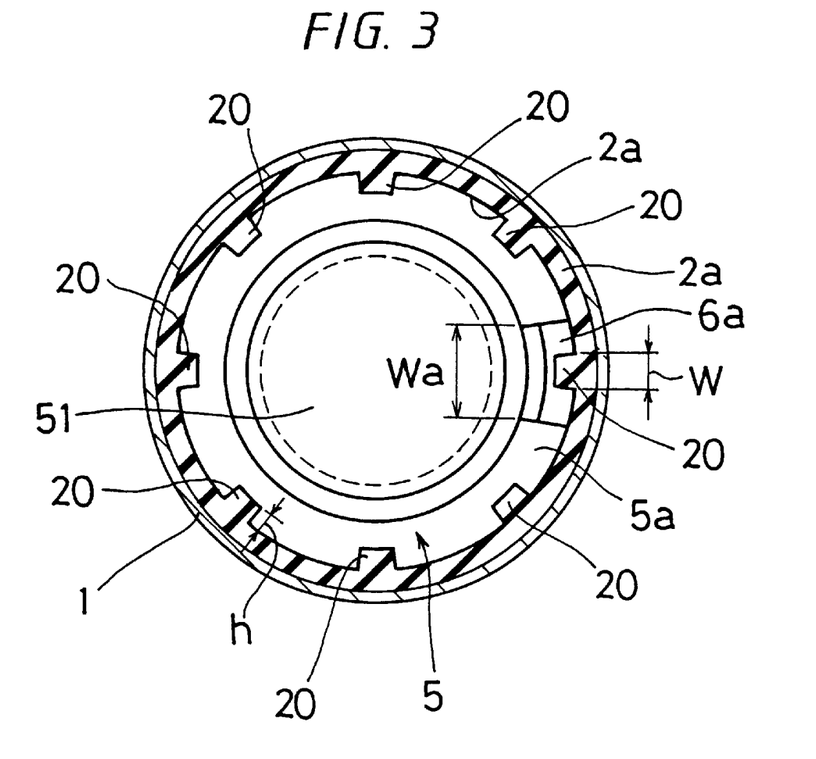
FIG. 3 is a transverse sectional view of another example.

As for the number of the protruding portions 20 for positioning, they may be provided at two or three positions if the positions are deviated from the port opening 6a. However, from the viewpoint of stability of the positioning and supporting function of the partition 5 by the protruding portions 20, in particular the stability of the positioning and supporting state where the port opening 6a overlaps with one of the protruding portions 20, it is desirable to dispose them at four or more positions circumferentially at intervals of an equal angular distance as illustrated.

In the illustrated example, a part of the upper fitting 3 is projected in a flange form as a stopper mechanism of the vibration-proof device A and the flange portion 31 is enveloped by a rubber layer 22 integral with the vibration-isolating base 2 to form a stopper projection 9. On the other hand, an upper end of the main body fitting 8 extending upwardly is bent inwardly slightly above the stopper projection 9, thus forming an inboard marginal portion 81 acting as a stopper, against which the projection 9 abuts elastically, when an upward displacement amount due to vibrations of the attachment fitting 3 is large, whereby further displacement is restrained.

The stopper projection 9 abuts on the inward marginal portion 81 in FIG. 1, but in the normal state of use, holds a predetermined clearance between the stopper projection 9 and the inward marginal portion 81.

The reference numeral 12 designates a stopper member serving additionally as a covering fixed to the upper attachment fitting 3.

The vibration-proof device A is assembled as follows: In a liquid tank, while the lower opening side of the cylindrical fitting 1 is upturned, the partition 5 and the diaphragm 4 in separate bodies having the auxiliary fitting 4a press-fitted in their marginal parts are fitted into the cylindrical fitting 1. The terminal edge 1a of the cylindrical fitting 1 is fixed onto the auxiliary fitting 4a of the diaphragm 4 by crimping. Thereby the first and the second liquid chambers 7a, 7b are filled with liquid, and the two-chamber type of vibration-proof device A as indicated in FIGS. 1 and 2 is obtainable.

Upon press-fitting of the partition 5 in the preceding assembling, the upper marginal portion 5a of the partition 5 is brought into contact with the step faces 20a of the protruding portions 20 for positioning on the inner face 2a of the vibration-isolating base 2 in an opposing manner thereby to achieve the axial positioning and supporting. At that time, since the protruding portions 20 for positioning are provided circumferentially at intervals at a plurality of positions, it is possible to readily assemble them onto the marginal portion 5a so that the port opening 6a of the orifice passage 6 is deviated from the positions of the protruding portions 20 for positioning. For example, the port opening 6a may be assembled so as to be located between one protruding portion 20 and the adjacent protruding portion 20.

By deviating the port opening 6a of the orifice passage 6 in the partition 5 from the plural positions of the protruding portions 20 for positioning in this manner, for example locating it between the protruding portions 20, 20, it is possible to ensure sufficiently the opening state of the port opening 6a, without the flow through the orifice passage 6 being impeded.

Where the circumferential width W of the protruding portions 20 is smaller than the circumferential width (Wa) of the port opening 6a, even if one of them overlaps with the port opening 6a, the port opening 6a can ensure a required opening area, so that the flow through the orifice passage 6 can be sufficiently ensured. In addition, upon press-fitting, there is no necessity of positioning the partition 5 and the protruding portions 20 in the peripheral direction and hence, the press-fitting work is facilitated. Further, the total length in the circumferential width of the protruding portions 20 is made in a range of 1/8 to 1/4 the circumferential length, whereby the positioning function can be performed securely.

Again, because a plurality of the protruding portions 20 are provided partially in a spaced relationship, the inside diameter of the vibration-isolating base 2 is enlarged and its effective rubber leg length, namely the effective diameter performing the piston action attended with the vertical oscillations of the attachment fitting 3 becomes larger, as a result of which the piston efficiency and the vibration damping performance can be enhanced.

According to the vibration-proof device of this invention as described above, the plural protruding portions for positioning provided circumferentially on the inner marginal part of the vibration-isolating base at predetermined intervals permit the partition to perform firmly the positioning and supporting function. Moreover, the port opening of the orifice passage existing in the upper marginal part of the partition is deviated from the protruding portions so as to be located midway between the protruding portions, whereby permitting the port opening to retain the required opening state and besides, also in case where the port opening overlaps with the protruding portion, both are constructed so that the opening area of the port opening can be ensured sufficiently. It is therefore possible to ensure the flow through the orifice passage sufficiently without the necessity of making the circumferential width of the port opening excessively large, and to retain a good vibration-damping characteristic.

Further by providing the plural protruding portions at intervals as described above, the effective rubber leg length, namely the effective diameter of the piston action accompanied by the vertical oscillations of the attachment fitting is made larger to the extent that the piston efficiency and the vibration-damping performance can be enhanced and the durability is also increased.

What is claimed is:

1. A liquid-sealed vibration-proof device comprising a cylindrical fitting, an attachment fitting, a vibration-isolating base made of rubber elastomer through which to interconnect the cylindrical fitting and the attachment fitting, a diaphragm made of rubber membrane and a partition positioned inwardly of the diaphragm both hermetically fixed to an open side of the cylindrical fitting opposing the vibration-isolating base, thus partitioning an interior room between the vibration-isolating base and the diaphragm into two liquid chambers, and an orifice passage, through which to put both liquid chambers into communication with each other, provided in an outer periphery of the partition, wherein the vibration-isolating base is provided, at a marginal part of its inner side, with protruding portions for positioning, with which a marginal portion of the partition is in opposed contact, the protruding portions being located at a plurality of positions circumferentially spaced apart at required intervals so as to ensure the flow at a port opening of the orifice passage through the orifice passage.

2. The vibration-proof device as claimed in claim 1, wherein the protruding portions for positioning are disposed at least circumferentially at intervals of a distance larger than a circumferential width of the port opening of the orifice passage.

3. The vibration-proof device as claimed in claim 1, wherein the protruding portions for positioning are disposed circumferentially at four or more positions spaced apart at intervals.

4. The vibration-proof device as claimed in claim 2, wherein the protruding portions for positioning are disposed circumferentially at four or more positions spaced apart at intervals.

5. The vibration-proof device as claimed in claim 1, wherein the protruding portions for positioning have each a smaller circumferential width than a circumferential width of the port opening of the orifice passage; and the protruding portions altogether have such a total length in circumferential width that equals to ⅛ to ¼ a circumferential length of the orifice passage.

6. The vibration-proof device as claimed in claim 2, wherein the protruding portions for positioning have each a smaller circumferential width than a circumferential width of the port opening of the orifice passage; and the protruding portions altogether have such a total length in circumferential width that equals to ⅛ to ¼ a circumferential length of the orifice passage.

7. The vibration-proof device as claimed in claim 3, wherein the protruding portions for positioning have each a smaller circumferential width than a circumferential width of the port opening of the orifice passage; and the protruding portions altogether have such a total length in circumferential width that equals to ⅛ to ¼ a circumferential length of the orifice passage.

8. The vibration-proof device as claimed in claim 4, wherein the protruding portions for positioning have each a smaller circumferential width than a circumferential width of the port opening of the orifice passage; and the protruding portions altogether have such a total length in circumferential width that equals to ⅛ to ¼ a circumferential length of the orifice passage.

9. The vibration-proof device as claimed in claim 1, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

10. The vibration-proof device as claimed in claim 2, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

11. The vibration-proof device as claimed in claim 3, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

12. The vibration-proof device as claimed in claim 4, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

13. The vibration-proof device as claimed in claim 5, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

14. The vibration-proof device as claimed in claim 6, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

15. The vibration-proof device as claimed in claim 7, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

16. The vibration-proof device as claimed in claim 8, wherein one of the protruding portions for positioning is formed, under the condition of overlapping with the port opening of the orifice passage, so that an opening area at the port opening excluding an overlapping area, on a plane, of the one protruding portion may be larger than the overlapping area of the protruding portion.

* * * * *